(12) United States Patent
Yang et al.

(10) Patent No.: US 7,164,783 B2
(45) Date of Patent: Jan. 16, 2007

(54) OBJECT INSPECTION SYSTEM

(75) Inventors: Wen-Jui Yang, Kaosiung Hsien (TW); Ming-Liau Yang, Kaohsiung Hsien (TW)

(73) Assignee: Ming Liau Co., Ltd., Kaohsiung Hsien (TW)

( * ) Notice: Subject to any disclaimer, the term of this patent is extended or adjusted under 35 U.S.C. 154(b) by 699 days.

(21) Appl. No.: 10/407,561

(22) Filed: Apr. 4, 2003

(65) Prior Publication Data

US 2004/0022427 A1   Feb. 5, 2004

(51) Int. Cl.
*G06K 9/00* (2006.01)
*B07C 5/00* (2006.01)

(52) U.S. Cl. .................................. 382/152; 209/576

(58) Field of Classification Search ............... 382/152, 382/141; 348/92; 700/112, 114; 209/576, 209/577, 587
See application file for complete search history.

(56) References Cited

U.S. PATENT DOCUMENTS 3,746,166 A * 7/1973 VanGaalen .................. 209/511
3,981,551 A * 9/1976 Miyazaki et al. ............ 312/249.8
4,042,114 A * 8/1977 Arild et al. ................... 209/587
4,319,269 A * 3/1982 Kajiura et al. ................ 348/92
4,823,396 A * 4/1989 Thompson .................... 382/152
5,150,623 A * 9/1992 Woods ......................... 73/865.8
6,597,445 B1 * 7/2003 Sugimoto ..................... 356/237.1
6,762,426 B1 * 7/2004 Gilliam ........................ 250/559.12
6,995,837 B1 * 2/2006 Moir et al. .................... 356/237.1
2004/0218804 A1 * 11/2004 Affleck et al. ................. 382/141
2005/0094867 A1 * 5/2005 Jones et al. ................... 382/152
2005/0147290 A1 * 7/2005 Ong et al. ..................... 382/152

* cited by examiner

*Primary Examiner*—Joseph Mancuso
*Assistant Examiner*—Hadi Akhavannik
(74) *Attorney, Agent, or Firm*—Rosenberg, Klein & Lee

(57) ABSTRACT

An object inspection system includes an object feeding device, a positioning device including a rotatable wheel with a peripheral edge face formed with retaining grooves for positioning objects from the feeding device, an image recognition detector for detecting a side portion of the object in each of the retaining grooves so as to generate image data, and an image processing device for receiving and converting the image data into a set of calculated dimensions and for comparing the set of calculated dimensions with a set of preset dimensions so as to generate a first signal or a second signal. First and second object removing member are controlled by the first and second signals, respectively, to remove the objects from the positioning device.

2 Claims, 4 Drawing Sheets

OBJECT INSPECTION SYSTEM

BACKGROUND OF THE INVENTION

1. Field of the Invention

This invention relates to an object inspection system for objects, such as screws.

2. Description of the Related Art

The specification of a screw normally includes geometric dimensions thereof, such as diameter of a head portion of the screw, diameter of a shank portion of the screw, and length of the screw. Conventionally, inspection of the geometric dimensions of the screw is performed by laying the screw on a projector so that the screw can be projected on a screen which is labeled with reference marks (such as a two dimensional coordinate) for measurement of the diameter of the shank portion, the diameter of the head portion, and the length of the screw. However, such inspection is easily susceptible to human error, and is laborious. Moreover, the head portion of the screw is normally formed with a groove which is adapted to receive a screw driver and which cannot be measured in terms of depth and shape with the use of the projector.

SUMMARY OF THE INVENTION

Therefore, it is an object of the present invention to provide an object inspection system that is capable of overcoming the aforementioned drawbacks.

According to the present invention, an object inspection system comprises: an object feeding device for feeding objects to be inspected; a positioning device including a rotatable wheel that is turnable about a vertical axis and that has a peripheral edge face surrounding the vertical axis, the peripheral edge face being formed with a plurality of equiangularly spaced apart retaining grooves that are adapted to receive and retain the objects from the feeding device, respectively; an image recognition detector disposed adjacent to the peripheral edge face so as to be adapted to detect the shape of the object in each of the retaining grooves that passes adjacent thereto and so as to generate first image data corresponding to the detected shape of the object; an image processing device that is electrically connected to the image recognition detector so as to receive the first image data therefrom, the image processing device converting the first image data into a first set of calculated dimensions, and comparing the first set of calculated dimensions with a first set of preset dimensions so as to generate a first signal when the first set of calculated dimensions conforms with the first set of preset dimensions to indicate presence of a conforming object, and a second signal when the first set of calculated dimensions does not conform with the first set of preset dimensions to indicate presence of a non-conforming object; a first object removing member connected to the image processing device, disposed adjacent to the peripheral edge face downstream of the image recognition detector, and capable of being actuated so as to remove the nonconforming object from the respective one of the retaining grooves upon receipt of the second signal; and a second object removing member connected to the image processing device, disposed adjacent to the peripheral edge face downstream of the first object removing member, and capable of being actuated so as to remove the conforming object from the respective one of the retaining grooves upon receipt of the first signal.

BRIEF DESCRIPTION OF THE DRAWINGS

In drawings which illustrate an embodiment of the invention.

DETAILED DESCRIPTION OF THE PREFERRED EMBODIMENT

Figure 1:
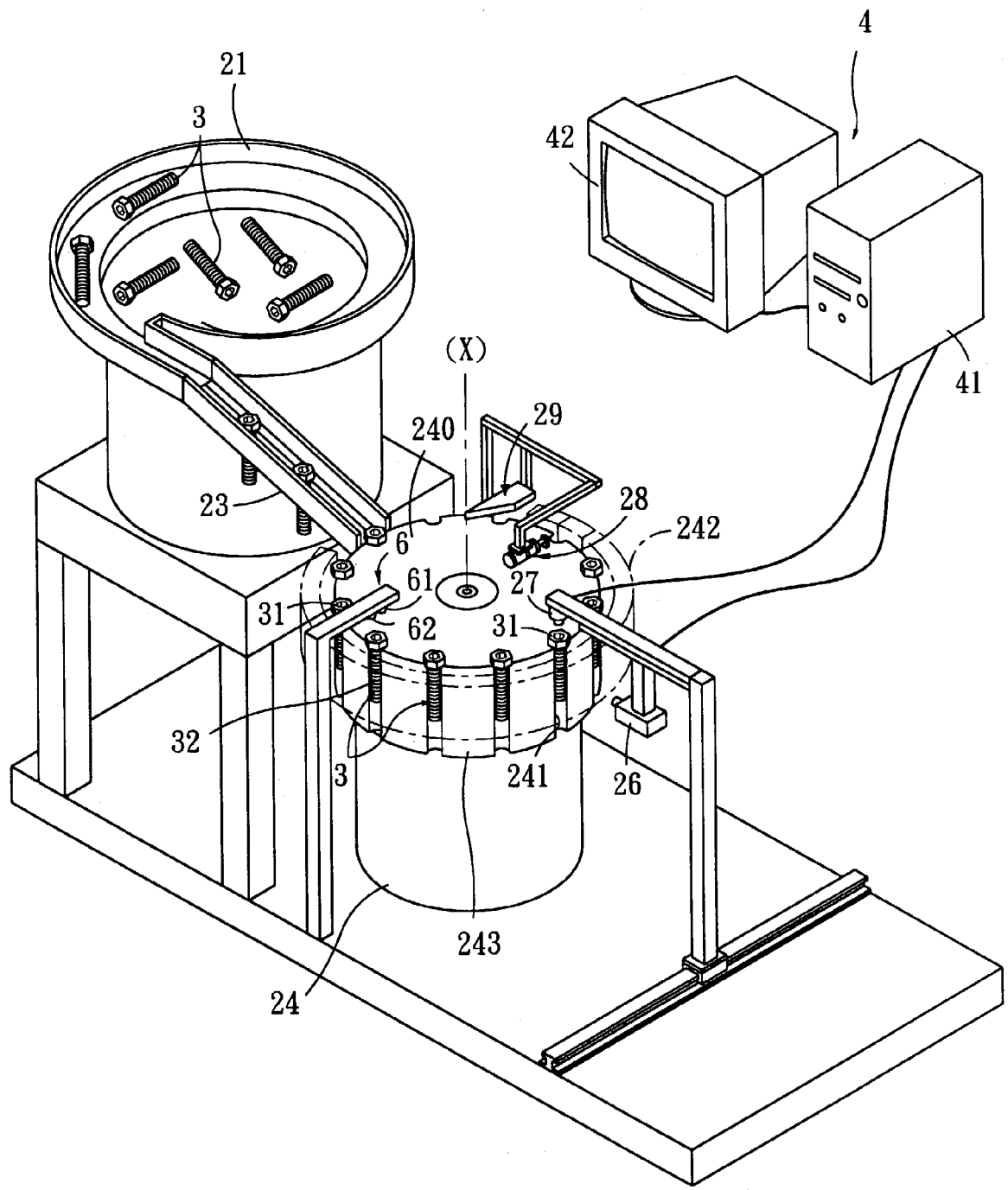
FIG. 1 is a schematic view of an object inspection system embodying this invention.
Figure 2:
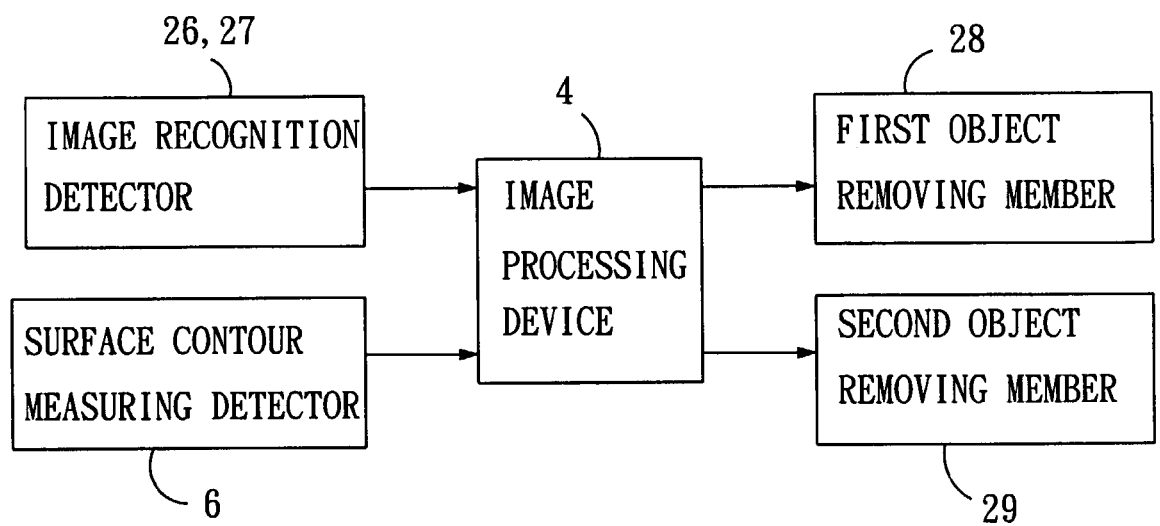
FIG. 2 is a block diagram to illustrate input and output connections of an image processing device of the object inspection system of FIG. 1.
Figure 3:
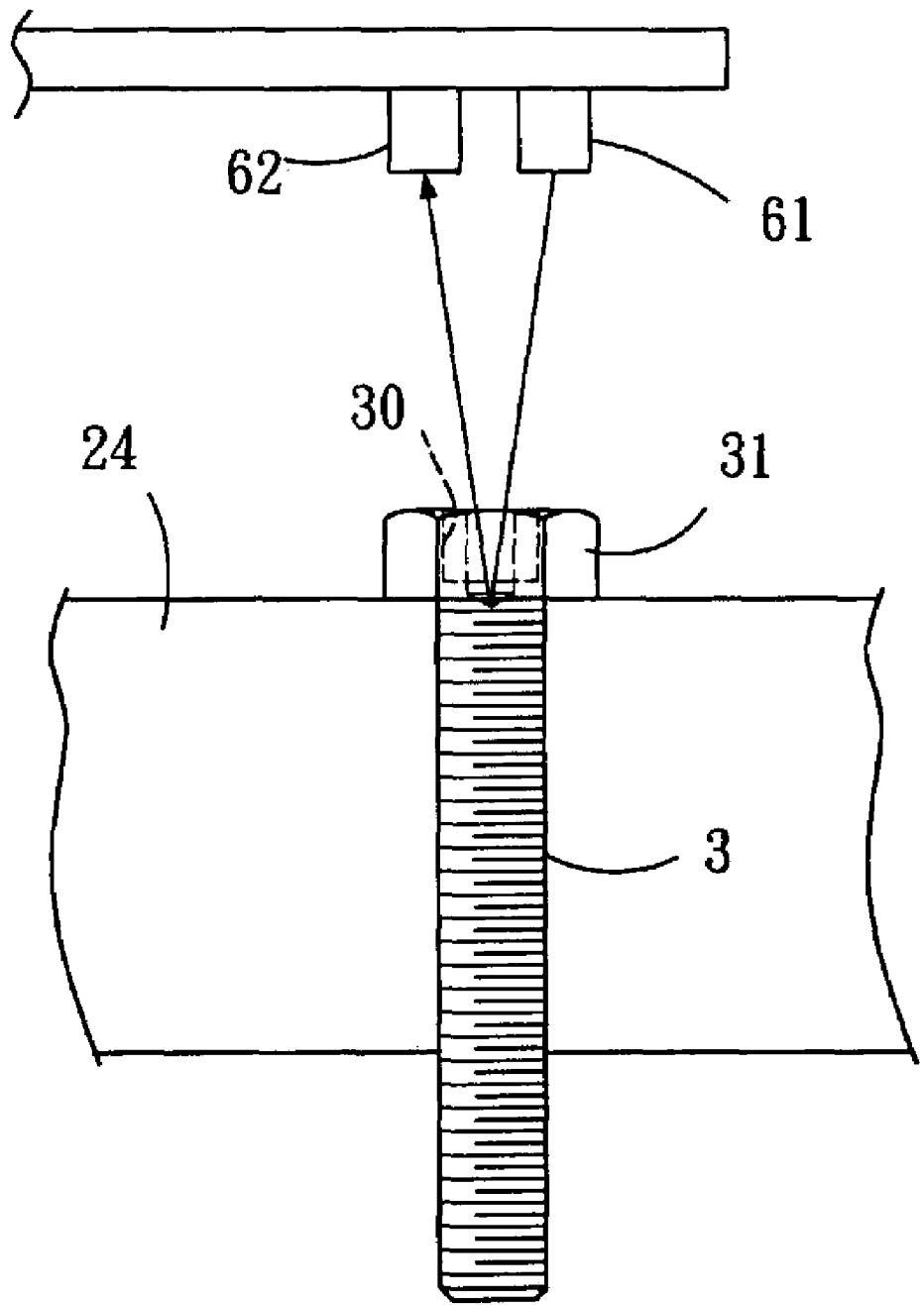
FIG. 3 is a fragmentary side view to illustrate how a groove in a head of the object is inspected by a surface contour measuring detector.
Figure 4:
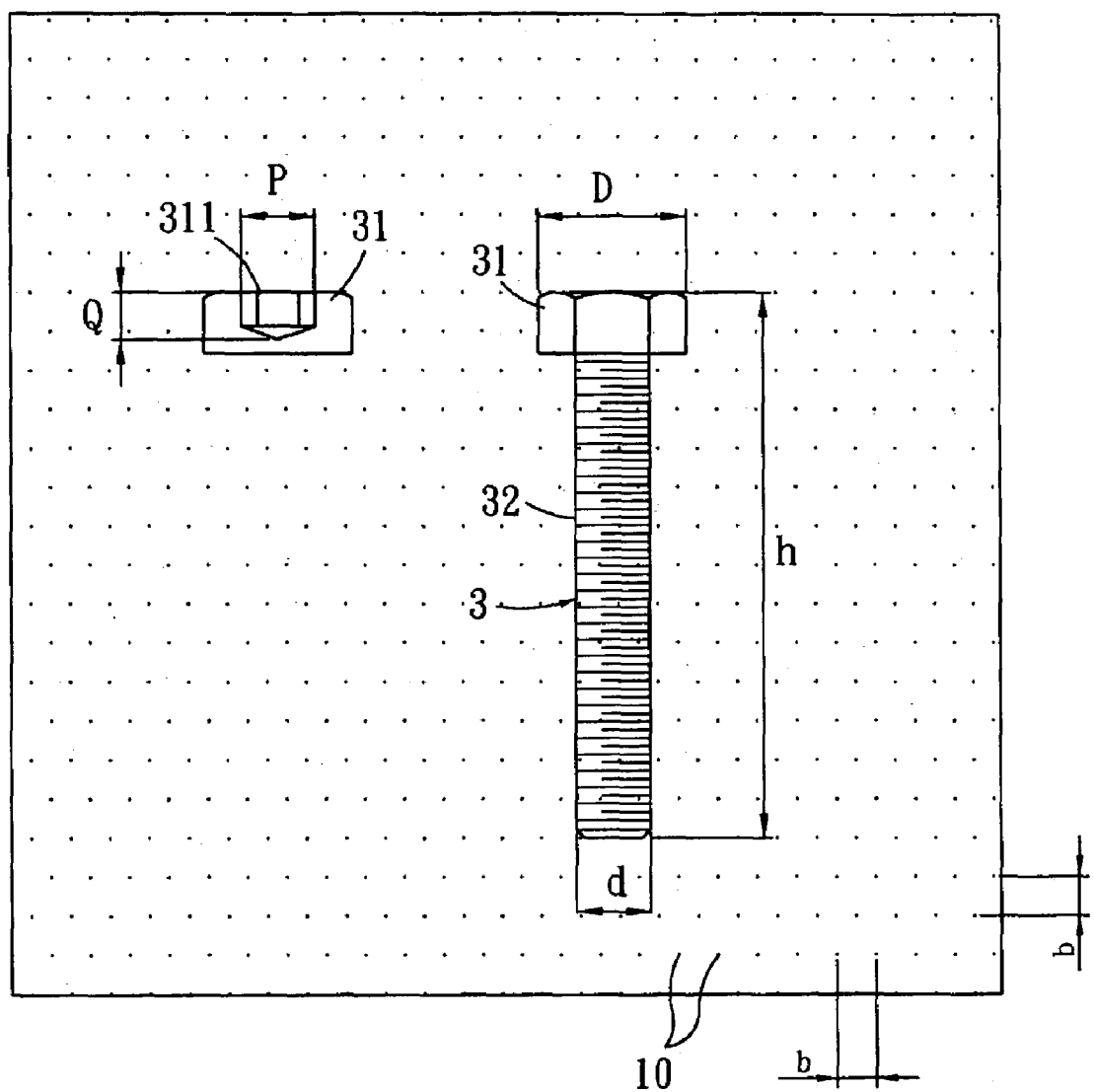
FIG. 4 is a schematic view to illustrate how geometric dimensions of a screw inspected by the object inspection system of FIG. 1 are calculated.

FIGS. 1 to 3 illustrate a preferred embodiment of an object inspection system for inspecting objects, such as screws 3. Each of the screws 3 is to be measured by the inspection system in terms of length (h), head diameter (D) of a head portion 31, shank diameter (d) of a shank portion 32, groove diameter (P) of a groove 311 in the head portion 31, and depth (Q) of the groove 311.

The object inspection system includes: an object feeding device having a container 21 and a conveying channel 23 that carries and that delivers the screws 3 one by one for subsequent inspection; a positioning device 24 including a rotatable wheel 240 that is turnable about a vertical axis (X) and that has a peripheral edge face 243 surrounding the vertical axis (X), the peripheral edge face 243 being formed with a plurality of equiangularly spaced apart retaining grooves 241 that are adapted to receive and retain the screws 3 from the conveying channel 23 of the feeding device, respectively; a pair of image recognition detectors 26, 27 disposed adjacent to the peripheral edge face 243 so as to detect the head and shank portions 31, 32 of the screw 3 in each of the retaining grooves 241 that passes adjacent thereto and so as to generate first image data corresponding to the detected head and shank portions; an image processing device 4 that includes a computer 41 and a display 42, and that is electrically connected to the image recognition detectors 26, 27 so as to receive the first image data therefrom, the image processing device 4 converting the first image data into a first set of calculated dimensions, i.e. the screw length (h), the head diameter (D) of the head portion 31, and the shank diameter (d) of the shank portion 32 of the screw 3, and comparing the first set of calculated dimensions with a first set of preset dimensions so as to generate a first signal when the first set of calculated dimensions conforms with the first set of preset dimensions to indicate presence of a conforming screw 3, and a second signal when the first set of calculated dimensions does not conform with the first set of preset dimensions to indicate presence of a non-conforming screw 3; a first object removing member 28 connected to the image processing device 4, disposed adjacent to the peripheral edge face 243 downstream of the image recognition detectors 26, 27, and capable of being actuated so as to remove the non-conforming screw 3 from the respective one of the retaining grooves 241 upon receipt of the second signal; and a second object removing member 29 connected to the image processing device 4, disposed adjacent to the peripheral edge face 243 downstream of the first object removing member 28, and capable of being actuated so as to remove the conforming screw 3 from the respective one of the retaining grooves 241 upon receipt of the first signal.

The object inspection system further includes a surface contour measuring detector 6 that is disposed adjacent to the rotatable wheel 240 of the positioning device 24, that includes a light beam generator 61 and a light beam receiver 62, that is disposed upstream of the first object removing member 28, and that is adapted to be vertically aligned with the head portion 31 of the screw 3 which passes thereto so as to detect a groove-defining face of the groove 311 in the head portion 31 of the screw 3 in each of the retaining grooves 241 and so as to generate second image data corresponding to the detected groove-defining face of the groove 311 in the head portion 31. The detection is performed by dividing the groove-defining face of the groove 311 in the head portion 31 of the screw 3 into a plurality of small regions, aligning the surface contour measuring detector 6 with the groove-defining face at one of the small regions, and subsequently emitting a light beam from the light beam generator 61 to the selected small region of the groove-defining face so as to generate a reflective beam that can be received by the light beam receiver 62. The processing steps are repeated until all of the small regions have been detected. The image processing device 4 is electrically connected to the surface contour measuring detector 6 so as to receive the second image data therefrom. The image processing device 4 converts the second image data into a second set of calculated dimensions, i.e. the groove diameter (P) of the groove 311 and the depth (Q) of the groove 311, and compares the second set of calculated dimensions with a second set of preset dimensions so as to generate the first signal when the second set of calculated dimensions conforms with the second set of preset dimensions to indicate presence of the conforming screw 3, and the second signal when the second set of calculated dimensions does not conform with the second set of preset dimensions to indicate presence of the nonconforming screw 3.

Referring to FIG. 3, the detected screw 3 is displayed on the display 42 which consists of an array of pixels 10. Adjacent columns and rows of the array of the pixels 10 have a distance (b) therebetween. Each of the screw length (h), the head diameter (D) of the head portion 31, the shank diameter (d) of the shank portion 32, the groove diameter (P) of the groove 311, and the depth (Q) of the groove 311 spans a respective number of the pixels 10 along a respective column or row of the array of the pixels 10, and is equal to the respective number of the pixels 10, which is spanned thereby, multiplied by the pixel distance (b).

With the image recognition detector 26, 27 and the surface contour measuring detector 6, the aforesaid drawbacks associated with the prior art can be eliminated.

With the invention thus explained, it is apparent that various modifications and variations can be made without departing from the spirit of the present invention. It is therefore intended that the invention be limited only as recited in the appended claims.

We claim:

1. An object inspection system comprising:
   an object feeding device for feeding objects to be inspected;
   a positioning device including a rotatable wheel that is turnable about a vertical axis and that has a peripheral edge face surrounding said vertical axis, said peripheral edge face being formed with a plurality of equiangularly spaced apart retaining grooves that are adapted to receive and retain the objects from said feeding device, respectively;
   a plurality of image recognition detectors disposed adjacent to said peripheral edge face, and transversely offset one relative to the other about the object, so as to detect the shape at respective portions of the object in each of said retaining grooves that passes adjacent thereto, the image recognition detectors collectively generating first image data corresponding to the detected shape of the object;
   an image processing device that is electrically connected to said image recognition detector so as to receive the first image data therefrom, said image processing device converting the first image data into a first set of calculated dimensions, and comparing the first set of calculated dimensions with a first set of preset dimensions so as to generate a first signal when the first set of calculated dimensions conforms with the first set of preset dimensions to indicate presence of a conforming object, and a second signal when the first set of calculated dimensions does not conform with the first set of preset dimensions to indicate presence of a non-conforming object;
   a first object removing member connected to said image processing device, disposed adjacent to said peripheral edge face downstream of said image recognition detector, and capable of being actuated so as to remove the non-conforming object from the respective one of said retaining grooves upon receipt of the second signal; and
   a second object removing member connected to said image processing device, disposed adjacent to said peripheral edge face downstream of said first object removing member, and capable of being actuated so as to remove the conforming object from the respective one of said retaining grooves upon receipt of the first signal.

2. An object inspection system comprising:
   an object feeding device for feeding objects to be inspected;
   a positioning device including a rotatable wheel that is turnable about a vertical axis and that has a peripheral edge face surrounding said vertical axis, said peripheral edge face being formed with a plurality of equiangularly spaced apart retaining grooves that are adapted to receive and retain the objects from said feeding device, respectively;
   an image recognition detector disposed adjacent to said peripheral edge face so as to be adapted to detect the shape of the object in each of said retaining grooves that passes adjacent thereto and so as to generate first image data corresponding to the detected shape of the object;
   an image processing device that is electrically connected to said image recognition detector so as to receive the first image data therefrom, said image processing device converting the first image data into a first set of calculated dimensions, and comparing the first set of calculated dimensions with a first set of preset dimensions so as to generate a first signal when the first set of calculated dimensions conforms with the first set of preset dimensions to indicate presence of a conforming object, and a second signal when the first set of calculated dimensions does not conform with the first set of preset dimensions to indicate presence of a non-conforming object;
   a first object removing member connected to said image processing device, disposed adjacent to said peripheral edge face downstream of said image recognition detector, and capable of being actuated so as to remove the non-conforming object from the respective one of said retaining grooves upon receipt of the second signal;

a second object removing member connected to said image processing device, disposed adjacent to said peripheral edge face downstream of said first object removing member, and capable of being actuated so as to remove the conforming object from the respective one of said retaining grooves upon receipt of the first signal; and, a surface contour measuring detector that is disposed upstream of said first object removing member and that is disposed adjacent to said rotatable wheel so as to be adapted to detect a top face of the object in each of said retaining grooves which passes adjacent thereto and so as to generate second image data corresponding to the detected top face, said image processing device being electrically connected to said surface contour measuring detector so as to receive the second image data therefrom, said image processing device converting the second image data into a second set of calculated dimensions, and comparing the second set of calculated dimensions with a second set of preset dimensions so as to generate the first signal when the second set of calculated dimensions conforms with the second set of preset dimensions to indicate presence of the conforming object, and the second signal when the second set of calculated dimensions does not conform with the second set of preset dimensions to indicate presence of the non-conforming object.

* * * * *